United States Patent
Usui (10) Patent No.: US 8,648,577 B2
(45) Date of Patent: Feb. 11, 2014

(54) DC-DC CONVERTER

(75) Inventor: Hiroshi Usui, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 261 days.

(21) Appl. No.: 13/304,919

(22) Filed: Nov. 28, 2011

(65) Prior Publication Data

US 2012/0139512 A1 Jun. 7, 2012

(30) Foreign Application Priority Data

Dec. 2, 2010 (JP) ................. 2010-269162

(51) Int. Cl.
*H02M 3/155* (2006.01)
*H02M 3/158* (2006.01)

(52) U.S. Cl.
USPC .................. 323/225; 323/259; 323/288

(58) Field of Classification Search
USPC .................. 323/222, 225, 259, 282–288
See application file for complete search history.

(56) References Cited

U.S. PATENT DOCUMENTS

| | | | | |
|---|---|---|---|---|
| 5,481,238 A | * | 1/1996 | Carsten et al. | 336/214 |
| 6,236,191 B1 | * | 5/2001 | Chaffai | 323/225 |
| 6,809,503 B1 | * | 10/2004 | Eagar | 323/222 |
| 7,579,814 B2 | * | 8/2009 | Orr | 323/259 |
| 7,952,334 B2 | | 5/2011 | Usui | |
| 8,040,697 B2 | * | 10/2011 | Zhou et al. | 363/21.02 |
| 2010/0302817 A1 | | 12/2010 | Usui | |
| 2011/0007529 A1 | | 1/2011 | Usui | |

FOREIGN PATENT DOCUMENTS

JP 2009-44814 2/2009

* cited by examiner

*Primary Examiner* — Jessica Han
(74) *Attorney, Agent, or Firm* — Oblon, Spivak, McClelland, Maier & Neustadt, L.L.P.

(57) ABSTRACT

The present invention provides a DC-DC converter including: a first series circuit which is connected to the two ends of a direct-current power source Vi, and in which a first switching element Q1 and a second switching element Q2 are connected together in series; a control circuit 10 configured to alternately turn on and off the first switching element and the second switching element; a second series circuit which is connected to the two ends of the first switching element, and in which a first capacitor Ci, a first reactor Ls and a second reactor Ll having a larger value than the first reactor are connected together in series; and rectifying/smoothing circuits (Do, Co) configured to rectify and smooth a voltage between the two ends of the second reactor, and to output a direct-current output voltage.

8 Claims, 13 Drawing Sheets

FIG. 4A
PRIOR ART
HEAVY LOAD

FIG. 4B
PRIOR ART
MEDIUM LOAD

FIG. 4C
PRIOR ART
LIGHT LOAD

DC-DC CONVERTER

TECHNICAL FIELD

The present invention relates to a DC-DC converter which is excellent in load transient response.

BACKGROUND ART

Figure 1:
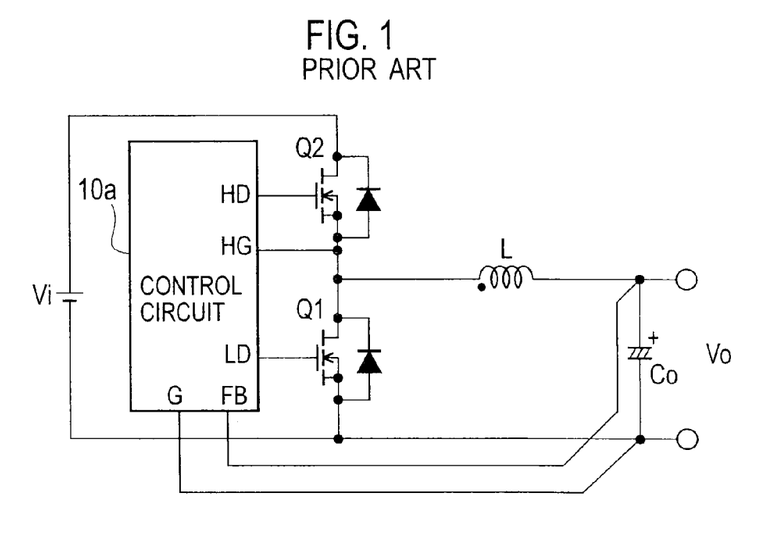
FIG. 1 is a circuit configuration diagram showing an example of a conventional DC-DC converter.

FIG. 1 shows an example of a conventional DC-DC converter. In FIG. 1, a series circuit, which includes a switching element Q1 formed of a MOSFET and the like as well as a switching element Q2 formed of a MOSFET and the like, is connected to a direct-current power source Vi. In addition, a series circuit including a reactor L and a smoothing capacitor Co is connected in parallel to the switching element Q1 at its two ends. A control circuit 10a alternately turns on and off the switching element Q1 and the switching element Q2, whereby an output voltage Vo is obtained from the two ends of the smoothing capacitor Co.

In other words, the DC-DC converter is formed of a general step-down chopper circuit including the switching element Q2, the reactor L, a parasitic diode of the switching element Q1, and the smoothing capacitor Co. The DC-DC converter is the synchronously-rectifying step-down chopper circuit in which a MOS-FET portion of the switching element Q1 is switched on and off in accordance with a conduction period of the parasitic diode of the switching element Q1.

Figure 2:
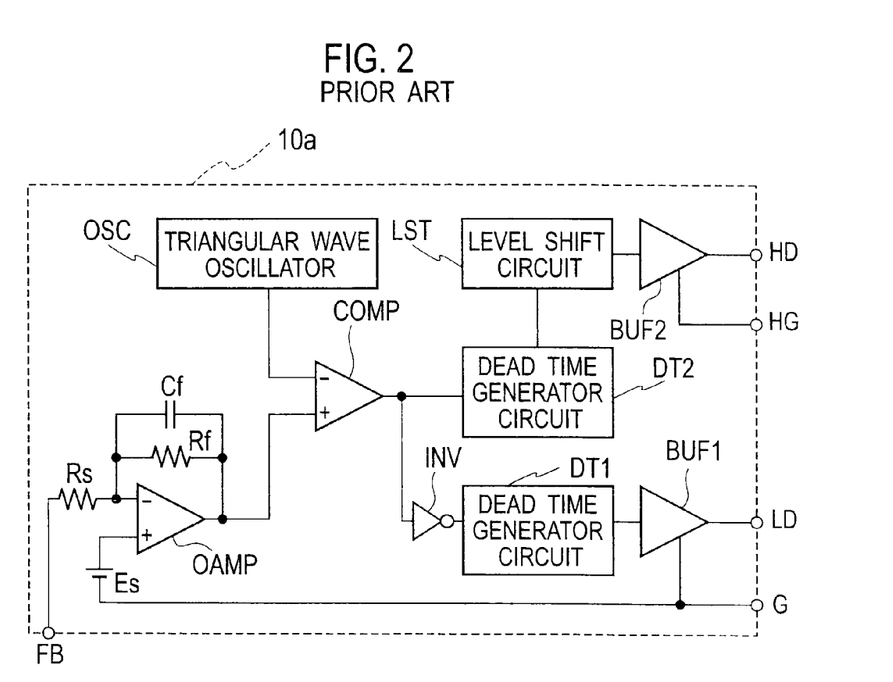
FIG. 2 is a detailed configuration block diagram of a control circuit in the DC-DC converter shown in FIG. 1.

The DC-DC converter operates in the following manner. Firstly, the switching elements Q1, Q2 are operated under switching control based on gate drive signals LD, HD from the control circuit 10a, respectively. FIG. 2 shows a detailed configuration diagram of the control circuit 10a. The control circuit 10a includes a triangular wave oscillator OSC, a PWM comparator COMP, an operational amplifier DAMP serving as an error amplifier, a reference voltage Es, a resistor Rs, a resistor Rf, a capacitor Cf, an inverter INV, dead time generator circuits DT1, DT2, a level shifter circuit LST, and buffer circuits BUF1, BUF2.

A feedback (FB) terminal receives the output voltage Vo of the smoothing capacitor Co as a feedback voltage. The operational amplifier CAMP compares the feedback voltage inputted from the FB terminal through the resistor Rs with the reference voltage Es, and outputs a comparison result as an error signal to a non-inverting terminal of the comparator COMP.

The comparator COMP compares the error signal from the operational amplifier DAMP with a triangular wave signal from the triangular wave oscillator OSC, and generates a PWM signal. The dead time generator circuit DT2 adds a predetermined dead time to the PWM signal. The level shifter circuit LST coverts the PWM signal with the predetermined dead time added thereto into a predetermined-level PWM signal. The buffer circuit BUF2 outputs the converted predetermined-level PWM signal, as a high side gate drive signal HD, to a gate of the switching element Q2. Thus, the ON/OFF of the switching element Q2 is controlled.

Figure 3:
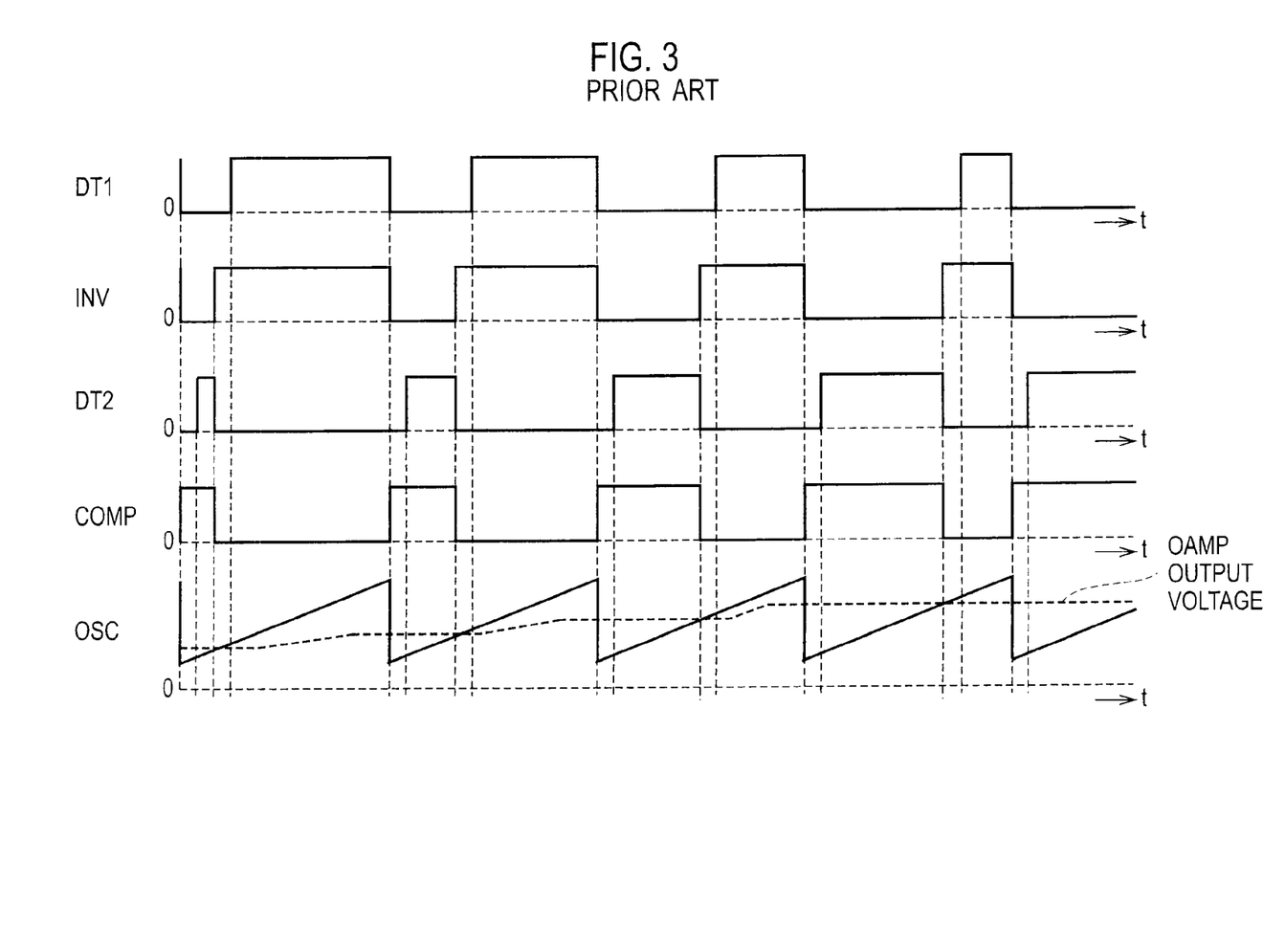
FIG. 3 is a diagram showing waveforms at units in the control circuit shown in FIG. 2.

Meanwhile, the inverter INV inverts the PWM signal, the dead time generator circuit DT1 adds a dead time to the PWM signal, and the buffer circuit BUF1 outputs the PWM signal with the dead time added thereto, as a low side gate drive signal LD, to a gate of the switching element Q1. Thus, the ON/OFF of the switching element Q1 is controlled complementarily to the ON/OFF of the switching element Q2. FIG. 3 shows waveforms at the units in the control circuit 10a.

Figure 4A:
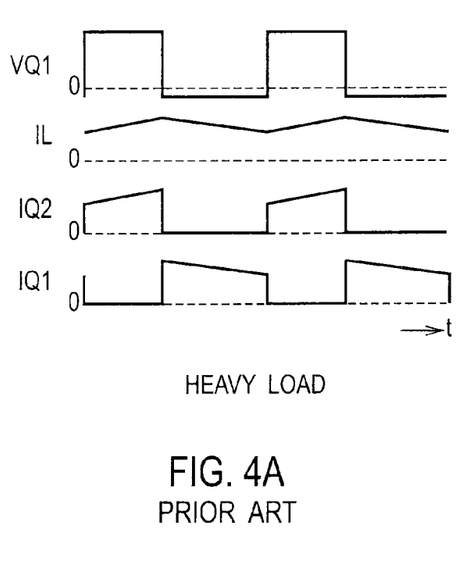
FIGS. 4A to 4C are diagrams showing waveforms at components in the conventional DC-DC converter shown in FIG. 1.
Figure 4B:
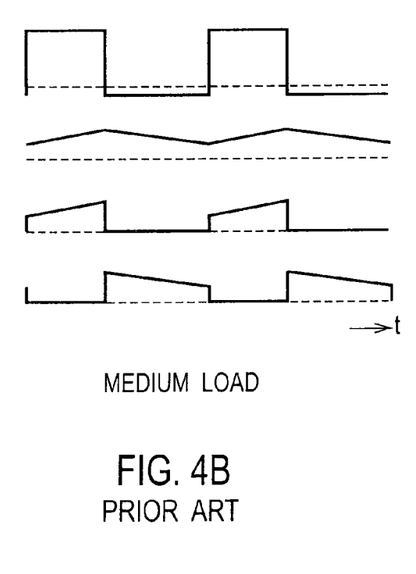
Figure 4C:
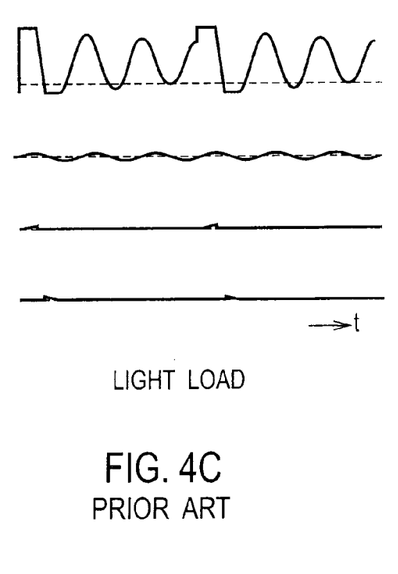

FIGS. 4A to 4C show waveforms at the components in the conventional DC-DC converter. FIG. 4A shows the waveforms at a heavy load; FIG. 4B, at a medium load; and FIG. 4C, at a light load. When the switching element Q2 is turned on, the direct-current power source Vi applies a voltage VL to the reactor L.

The voltage VL is expressed with $VL$=input voltage $Vi$−output voltage $Vo$.

A gradually-increasing current IL flows through the reactor L. When the switching element Q2 is turned off, a current stops flowing to the switching element Q2, and is commutated to the parasitic diode of the switching element Q1. During this commutation, once the switching element Q1 is turned on, a current IQ1 of the switching element Q1 flows to the MOS-FET portion of the switching element Q1. A saturation voltage Vron (Q1) at this time is expressed with $Vron$=reactor current $IL$×ON resistance $Ron$ of switching element $Q1$.

For this reason, if a MOS-FET having a small ON resistance Ron is selected, the saturation voltage Vron is made smaller than a forward voltage Vf of the parasitic diode, and the loss in the switching element Q1 at the time of turning on can be reduced.

While the DC-DC converter is in a continuous current mode in which the current IL flows even while the switching element Q1 is OFF, the ON widths of the switching elements Q1, Q2 remain almost unchanged as in FIGS. 4A and 4B.

Figure 5:
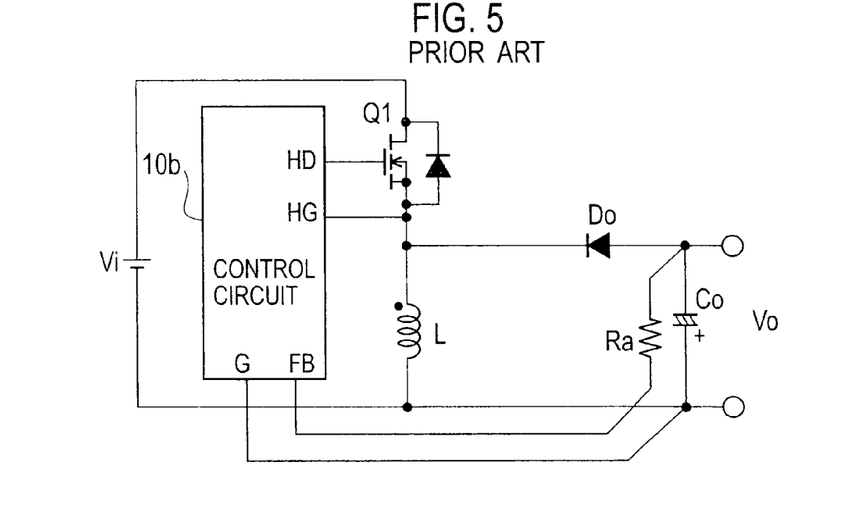
FIG. 5 is a circuit configuration of diagram showing an example of another conventional DC-DC converter.

FIG. 5 shows an example of another conventional DC-DC converter. In the example shown in FIG. 5, a series circuit of a switching element Q1 and a reactor L is connected to both ends of a direct-current power source Vi. The cathode of a diode is connected to one end of the reactor L is connected to, while the positive electrode of a smoothing capacitor is connected to the other end of the reactor L. The anode of a diode Do and the negative electrode of the smoothing capacitor Co are connected to one end of a resistor Ra, while a FB terminal of a control circuit 10b is connected to the other end of the resistor Ra.

Figure 6:
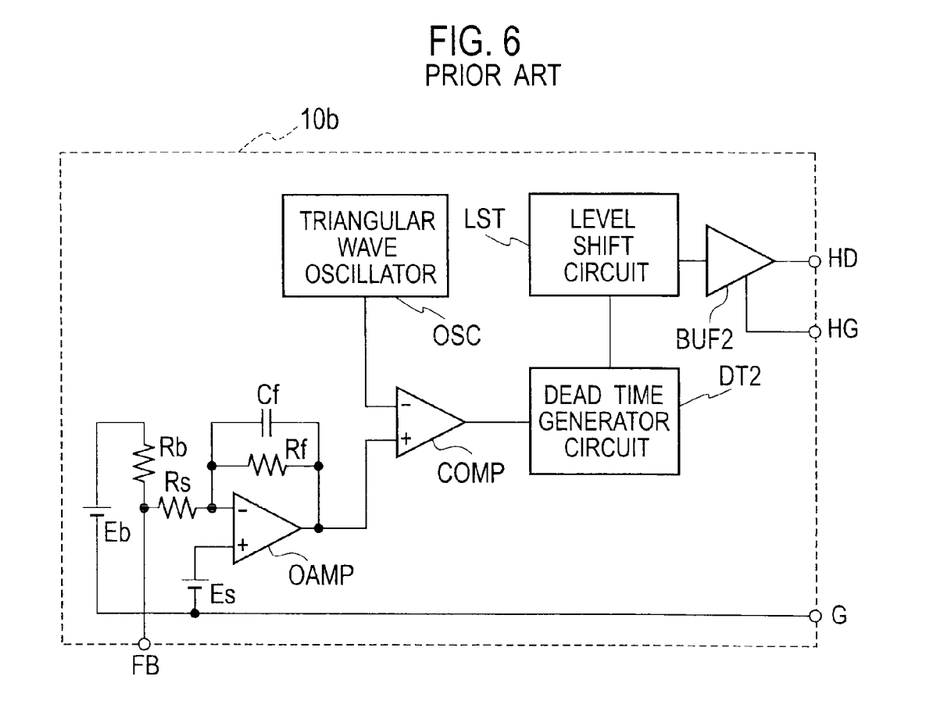
FIG. 6 is a detailed configuration block diagram of a control circuit in the DC-DC converter shown in FIG. 5.
Figure 7:
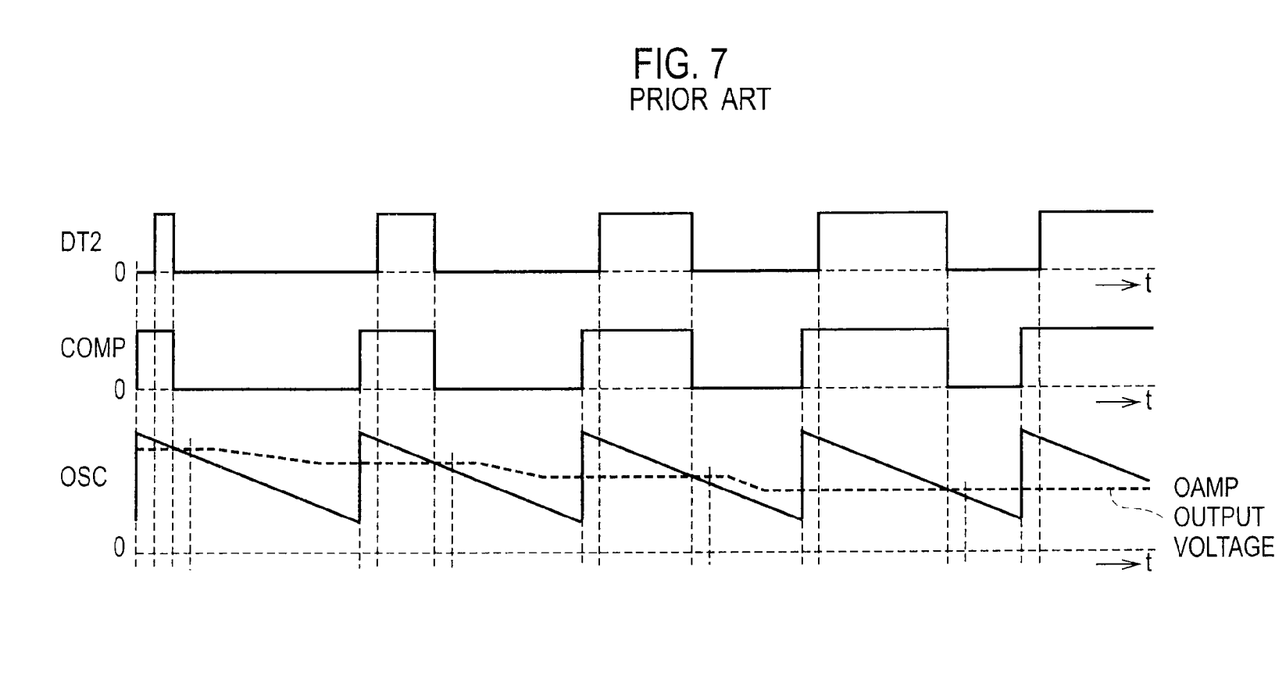
FIG. 7 is a diagram showing waveforms at units in the control circuit shown in FIG. 6.
Figure 8:
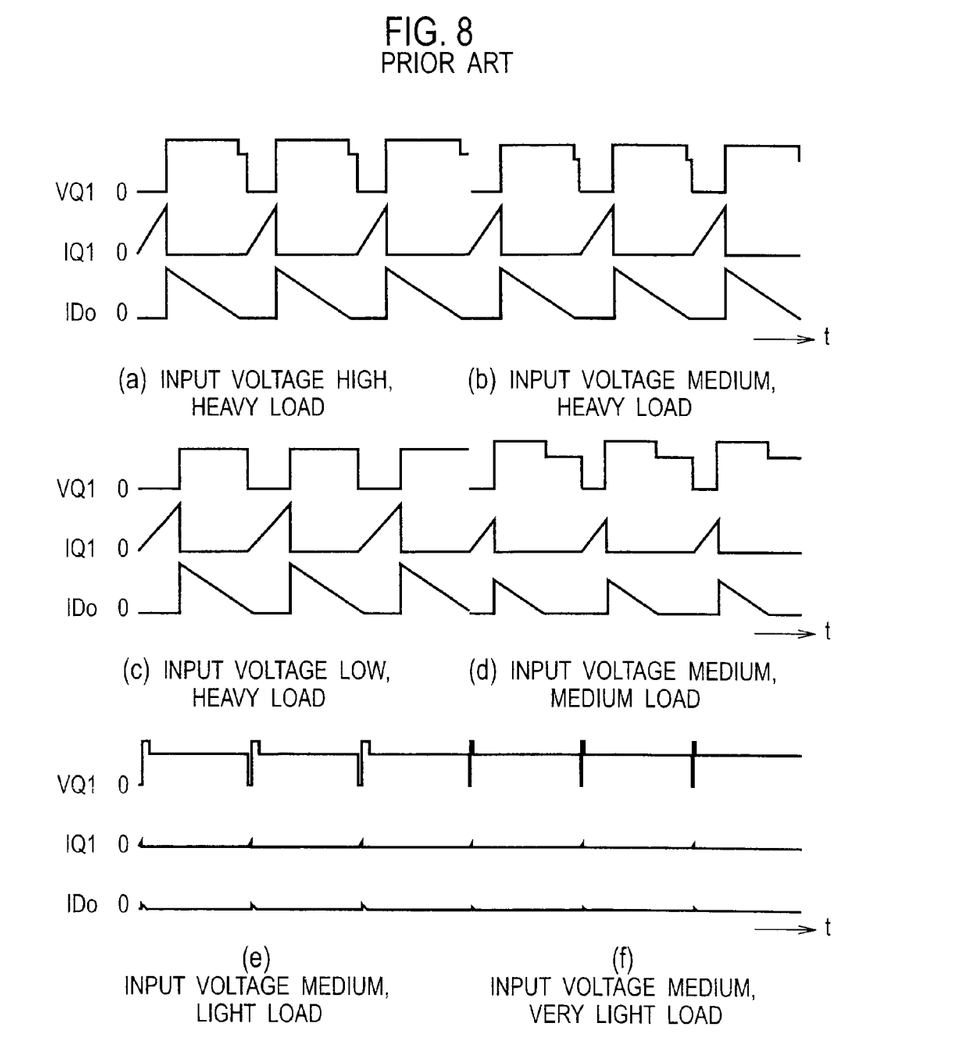
FIGS. 8(a) to 8(f) are diagrams showing waveforms at components in the DC-DC converter shown in FIG. 5.

FIG. 6 shows a detailed configuration block diagram of the control circuit in the DC-DC converter shown in FIG. 5. The control circuit 10b includes a triangular wave oscillator OSC, a PWM comparator COMP, an operational amplifier OAMP, a reference voltage Es, a reference voltage Eb, a resistor Rs, a resistor Rb, a resistor Rf, a capacitor Cf, a dead time generator circuit DT2, a level shifter circuit LST, and a buffer circuit BUF2. FIG. 7 shows waveforms at the units in the control circuit shown in FIG. 6. FIGS. 8(a) to 8(f) show waveforms at the components in the DC-DC converter shown in FIG. 5.

Note that a technique described in Japanese Patent Application Publication No. 2009-44814, for example, is known as the conventional technique.

However, when the load becomes light, the DC-DC converter enters a discontinuous current mode in which, as shown in FIG. 4C, no current flows while the switching element Q1 is OFF. In other words, if power consumption of the load falls below energy accumulated in the reactor L per switching, the ON width of the switching element Q1 needs to be narrowed. In this respect, the response characteristic of the operational amplifier OAMP cannot keep up with sharp load changes between the heavy and light loads. This causes a problem of upward and downward fluctuation in the output voltage Vo. To compensate the insufficiency of the response characteristic, a countermeasure is required, such as considerably increasing the capacity of the smoothing capacitor Co.

In addition, making a transient response of the operational amplifier OAMP faster leads to reducing a phase margin of a feedback system for the entire DC-DC converter, and poses a problem that the control system becomes unstable.

SUMMARY OF THE INVENTION

An object of the present invention is to provide a low-noise and highly efficient DC-DC converter which hardly causes ON/OFF ratios to change despite load fluctuation and thus has an enhanced load response characteristic.

The present invention provides a DC-DC converter including: a first series circuit which is connected to the two ends of a direct-current power source, and in which a first switching element and a second switching element are connected together in series; a control circuit configured to alternately turn on and off the first switching element and the second switching element; a second series circuit which is connected to the two ends of the first switching element, and in which a first capacitor, a first reactor, and a second reactor having a value larger than that of the first reactor are connected together in series; and a rectifying/smoothing circuit configured to rectify and smooth a voltage between the two ends of the second reactor, and to output a direct-current output voltage.

DESCRIPTION OF PREFERRED EMBODIMENTS

Hereinbelow, embodiments of a DC-DC converter of the present invention will be described in detail by referring to the drawings.

Embodiment 1

Figure 9:
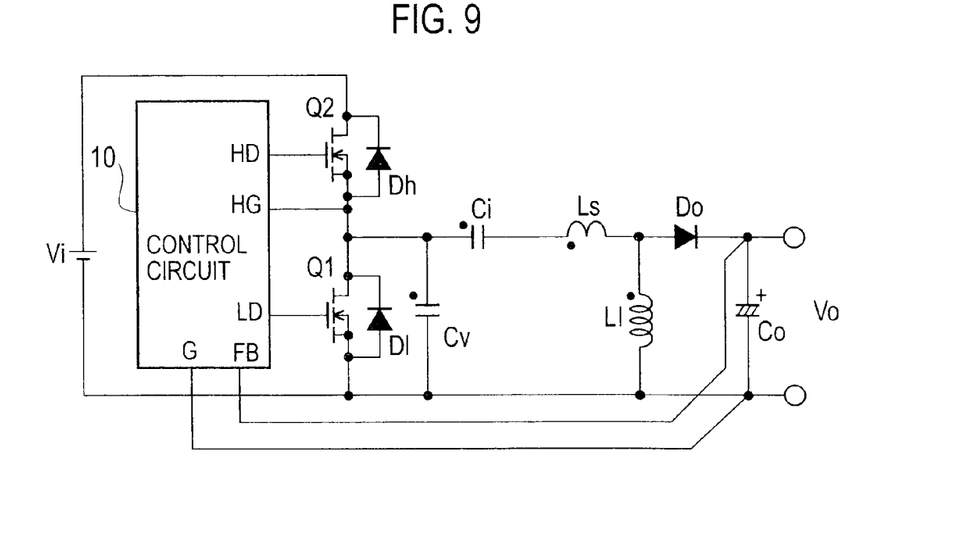
FIG. 9 is a circuit configuration diagram showing a DC-DC converter of Embodiment 1 of the present invention.

FIG. 9 is a circuit diagram showing a DC-DC converter of Embodiment 1 of the present invention. In FIG. 9, a series circuit (a first series circuit), which includes a switching element Q1 (a first switching element) formed of a MOSFET and the like as well as a switching element Q2 (a second switching element) formed of a MOSFET and the like, is connected to both ends of a direct-current power source Vi.

A voltage resonant capacitor Cv, as well as a series circuit (a second series circuit) including a current resonant capacitor Ci, a reactor Ls and a reactor Ll, is connected to both ends of the switching element Q1. A series circuit including a diode Do and a smoothing capacitor Co is connected to both ends of the reactor Ll. The diode Do and the smoothing capacitor Co constitute a half-wave rectifying/smoothing circuit.

The cathode of the diode Do and the positive electrode of the smoothing capacitor Co are connected to a FB terminal of a control circuit 10. The negative electrode of the smoothing capacitor Co is connected to the negative electrode of a direct-current power source Vi. Thereby, an output voltage Vo is obtained from the two ends of the smoothing capacitor Co.

Figure 10:
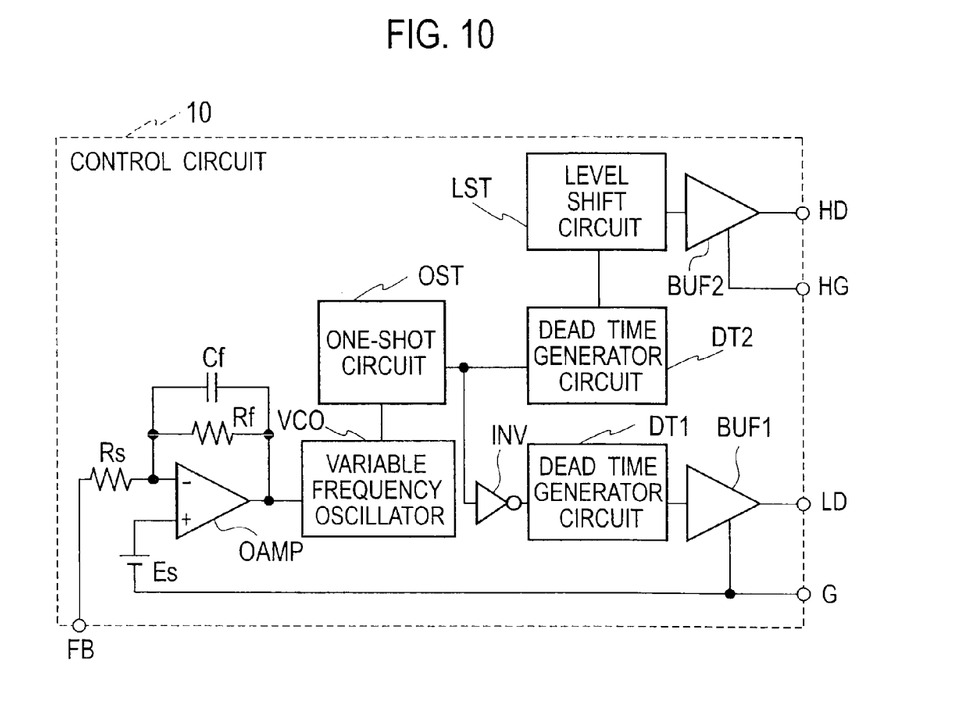
FIG. 10 is a detailed configuration block diagram of a control circuit in the DC-DC converter of Embodiment 1.

The switching elements Q1, Q2 are subjected to switching control based on gate drive signals LD, HD from the control circuit 10, respectively. FIG. 10 shows a detailed configuration diagram of the control circuit 10.

The control circuit 10 includes a variable frequency oscillator VCO, a one-shot circuit OST, an operational amplifier DAMP serving as an error amplifier, a reference voltage Es, a resistor Rs, a resistor Rf, a capacitor Cf, an inverter INV, dead time generator circuits DT1, DT2, a level shifter circuit LST, and buffer circuits BUF1, BUF2.

A parallel circuit including the resistor Rf and the capacitor Cf is connected to an inverting input terminal and an output terminal of the operational amplifier DAMP. The operational amplifier CAMP compares a feedback voltage inputted from the FB terminal through the resistor Rs with the reference voltage Es, and outputs a comparison output as an error signal to the variable frequency oscillator VCO.

Figure 11:
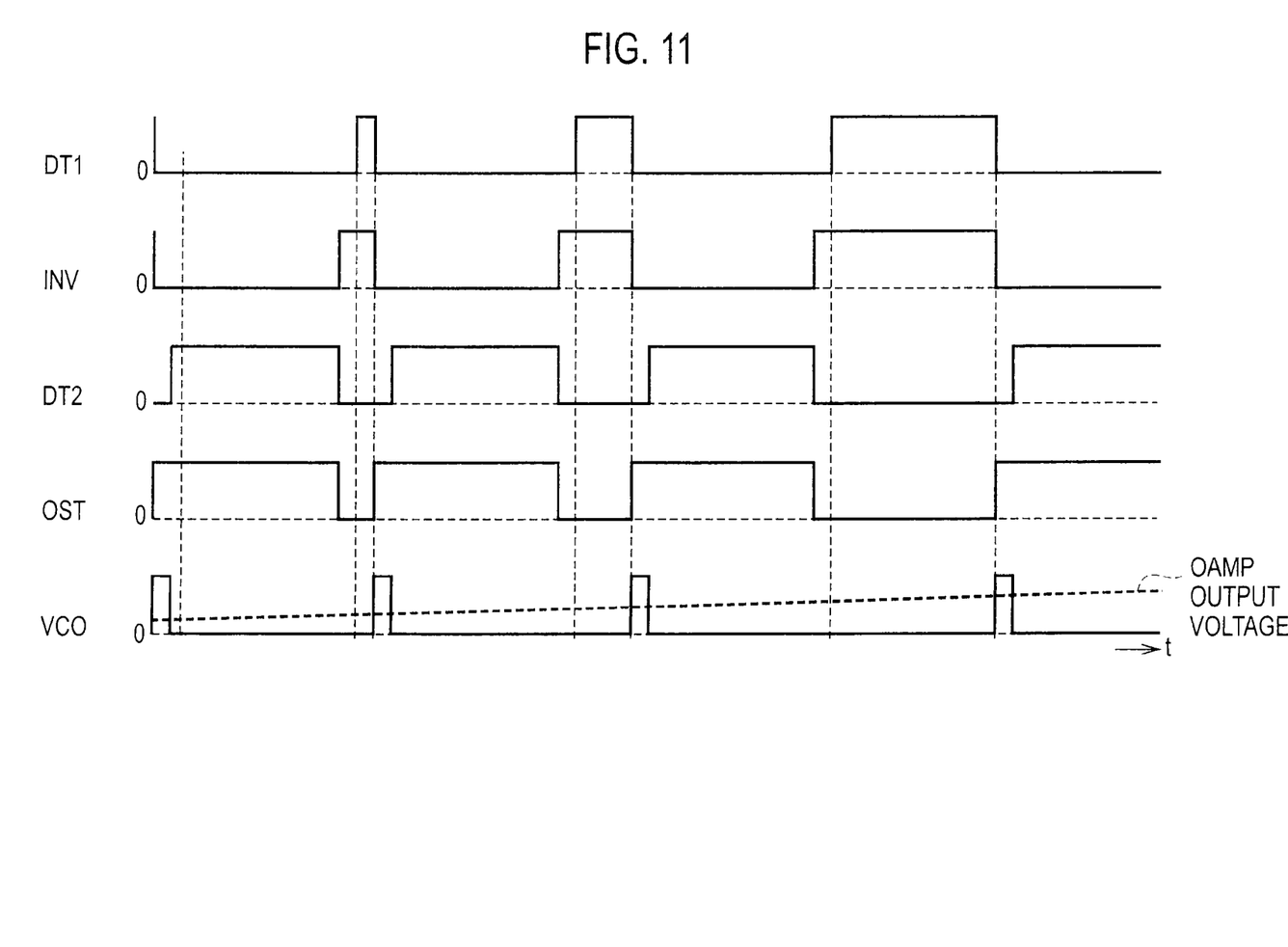
FIG. 11 is a diagram showing waveforms at units in the control circuit shown in FIG. 10.

The variable frequency oscillator VCO converts an DAMP output voltage from the operational amplifier CAMP into a pulse signal whose frequency is made variable, and generates a pulse signal (VCO shown in FIG. 11), for example, whose frequency becomes lower as the DAMP output voltage increases.

The one-shot circuit OST generates a one-shot signal (OST shown in FIG. 11) which has a H level for a certain length of time after the rise of each pulse of the variable-frequency pulse signal from the variable frequency oscillator VCO. The inverter INV generates an inverted signal (INV shown in FIG. 11) by inverting the one-shot signal from the one-shot circuit OST. The dead time generator circuit DT1 adds a predetermined dead time to the one-shot signal from the inverter INV. This dead time signal (DT1 shown in FIG. 11) is outputted through the buffer circuit BUF1 as a low side gate drive output LD which is a control signal for the switching element Q1.

The dead time generator circuit DT2 adds a predetermined dead time to each one-shot pulse from the one-shot circuit OST, and outputs the resultant pulse to the level shifter circuit LST. The level shifter circuit LST converts the pulse signal with the predetermined dead time added thereto into a predetermined-level signal. This dead time signal (DT2 shown in FIG. 11) is outputted through the buffer circuit BUF2 as a high side gate drive output HD which is a control signal for the switching element Q2.

Figure 12A:
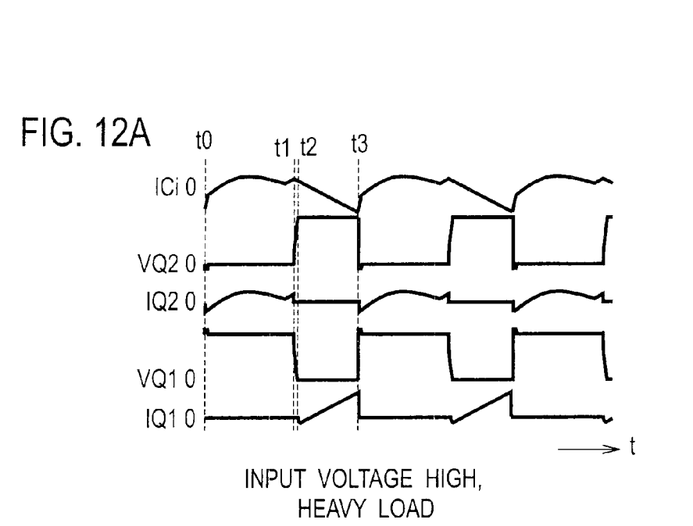
FIGS. 12A to 12D are diagrams showing waveforms at components in the DC-DC converter of Embodiment 1.
Figure 12B:
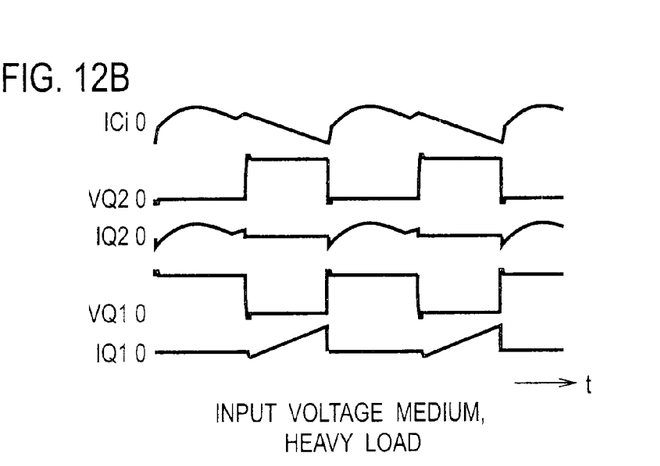
Figure 12C:
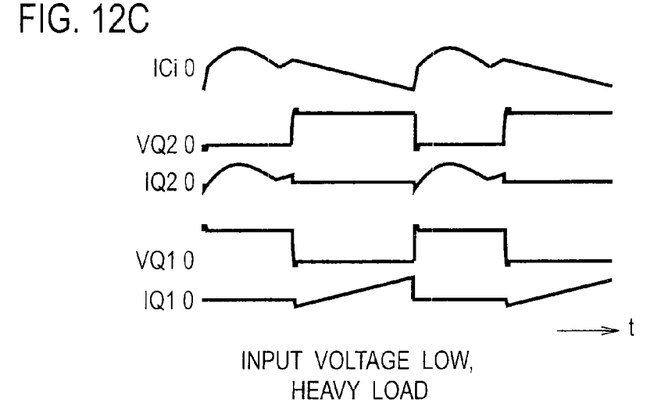
Figure 12D:
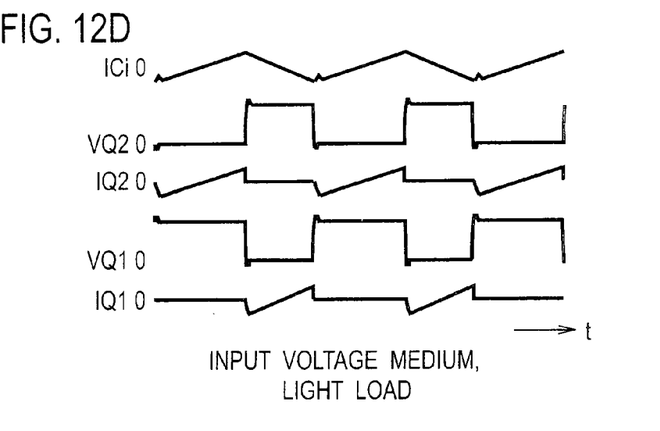

FIGS. 12A to 12D show waveforms at the components in the DC-DC converter of Embodiment 1 of the present invention. FIG. 12A shows waveforms at a high input voltage Vin and a heavy load; FIG. 12B, at a medium input voltage Vin and the heavy load; FIG. 12C, at a low input voltage Vin and the heavy load; and FIG. 12D, at the medium input voltage Vin and a light load.

In FIGS. 12A to 12D, ICi denotes a current flowing through the capacitor Ci; VQ2, a voltage between the drain and source of the switching element Q2; IQ2, a drain current of the switching element Q2; VQ1, a voltage between the drain and source of the switching element Q1; and IQ1, a drain current of the switching element Q1.

Next, operations in Embodiment 1 configured as described above will be described in detail by referring to the waveforms at the respective components shown in FIGS. 12A to 12D.

Firstly, in a period from time t0 to time t1, once the switching element Q2 is turned on, first resonance currents ICi, IQ2 flow through a path of Vi-Q2-Ci-Ls-Ll-Vi. Subsequently, the diode Do turns on, and a second resonance current flows through a path of Vi-Q2-Ci-Ls-Do-Co-Vi. Energy, which is accumulated in the smoothing capacitor Co due to the second resonance current, is supplied as the output voltage Vo to the load.

The first resonance currents ICi, IQ2 are resonance currents with a resonance frequency corresponding to the resonance between the capacitor Ci and the reactors (Ls+Ll). In this respect, since the reactors are set to satisfy Ls<<Ll, a resonance frequency f1 of the resonance is expressed with $$f1 \approx 1/2\pi\sqrt{Ci \cdot Ll}.$$ [Formula 1]

When the reactor Ll is increased, the resonance frequency f1 becomes much lower than a switching frequency, and is observed as straight lines between parts of a sinusoidal wave.

The second resonance current is a resonance current with a resonance frequency corresponding to the resonance between a series capacitor (Ci//Co), in which the capacitor Ci and the capacitor Co are connected together in series, and the reactor Ls. In general, since Ci<<Co, a resonance frequency f2 is expressed with $$f2 \approx 1/2\pi\sqrt{Ci \cdot Ls}.$$ [Formula 2]

The frequency f2 is set up by reducing the reactor Ls in a way that makes a half cycle of the sinusoidal wave appear in each ON width of the one-shot circuit OST.

In a period from time t1 to time t2, the diode Do turns off, and thereafter the switching element Q2 is turned off. By this, the current IQ2 stops flowing through the switching element Q2, and is commutated to the voltage resonant capacitor Cv, and energy accumulated due to the first resonance currents causes a voltage pseudo-resonance. A resonance frequency f of the voltage pseudo-resonance is expressed with $$f \approx 1/2\pi\sqrt{Ll \cdot Cv}.$$ [Formula 3]

Once the voltage resonant capacitor Cv thereby discharges to zero volts, the polarity of the current is inverted, and the current is commutated to the parasitic diode of the switching element Q1. Zero voltage switching of the switching element Q1 is achieved by turning on the switching element Q1 while the current is flowing through the parasitic diode of the switching element Q1 during a dead time (a negative current period of the current IQ1 in FIG. 12) when the switching elements Q1 and Q2 are OFF.

Once the switching element Q1 is turned on in the period from time t2 to time t3, the first resonance currents ICi, IQ1 flow through a path of Ci-Q1-Ll-Ls-Ci, mainly using energy accumulated in the capacitor Ci as a voltage source. The current IQ1 linearly increases, while the current ICi decreases because the capacitor Ci discharges. While the switching element Q1 is turned on, the second resonance current does not flow because the diode Do is reverse-biased.

Once the switching element Q1 is turned off at time t3, the current stops flowing through the switching element Q1, and is commutated to the voltage resonant capacitor Cv, and the first resonance currents cause a voltage pseudo-resonance. Once the voltage resonant capacitor Cv is thereby charged up to a voltage of the direct-current power source Vi, the current is commutated to a parasitic diode of the switching element Q2.

The zero voltage switching of the switching element Q2 is achieved by turning on the switching element Q2 during a time period (a negative current period of the current IQ2 in FIG. 12) when the current is flowing through the parasitic diode of the switching element Q2 for a dead time when the switching elements Q1 and Q2 are OFF.

Note that in FIGS. 12A to 12D, the ON time of the switching element Q2 is constant, while the ON time of the switching element Q1 is variable, in accordance with a voltage value of the input voltage Vi.

The output voltage Vo is controlled based on an ON/OFF ratio of each of the switching elements Q1, Q2. Because of Ll>>Ls, the following equations are given in a period in which the resonance can be maintained.

$$Vo \approx Vi - VCi$$

$$Vo \approx Vi \times DQ1 \text{ (}DQ1\text{ denotes the ON/OFF ratio of the switching element } Q1.\text{)} \quad (1)$$

Judging from the equations (1), there is no direct relationship between the load current and the output voltage Vo, and thus the ON/OFF ratio of each of the switching elements Q1, Q2 hardly changes in response to the change in the load current. In the actual circuit, however, the ON/OFF ratio of each of the switching elements Q1, Q2 slightly changes in order to compensate for a voltage drop which occurs due to a line drop, resistance components of the respective semiconductor elements, and the like.

As described above, the DC-DC converter of Embodiment 1 hardly causes the ON/OFF ratio of each of the switching elements Q1, Q2 to change in response to the change in the load, and is accordingly uniquely excellent at the load response characteristic, because: the DC-DC converter is provided with the second series circuit which is connected to the two ends of the switching element Q1, and in which the capacitor Ci, the reactor Ls, and the reactor Ll having a value larger than that of the reactor Ls are connected together in series; and the direct-current output voltage is outputted by rectifying and smoothing the voltage of the reactor Ll. In sum, its circuit system itself has the response capability without needing to achieve the response by use of a control system.

Moreover, appropriately designing the circuit enables the current resonance and the voltage pseudo-resonance under every input/output condition, thus making it possible to achieve the zero voltage switching of the switching elements Q1, Q2. For this reason, an efficient and low-noise DC-DC converter can be provided. In particular, the reactors can be made smaller in size, because: the switching operation is based on the resonance; the switching loss is small in amount; and its frequency can be easily increased.

Further, the DC-DC converter of Embodiment 1 has an effect that no recovery current flows when the diode Do is OFF, because the switching element Q2 is turned off after the diode Do turns off.

Moreover, a small rated current is enough for the reactor Ll, and the reactor Ll can be made small in size, because the current flowing through the load does not pass through the reactor L. In addition, no transformer need be used, since power is supplied to the load through the path of Ci-Ls-Do-Co.

Embodiment 2

Figure 13:
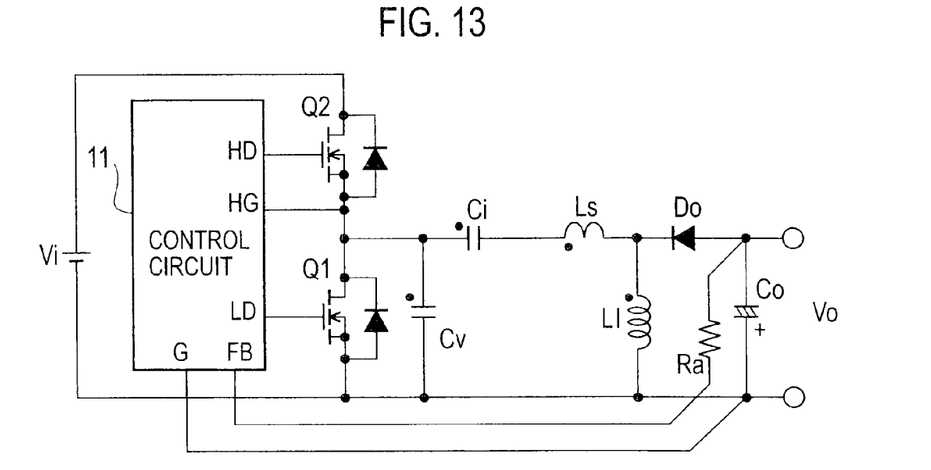
FIG. 13 is a circuit configuration diagram showing a DC-DC converter of Embodiment 2 of the present invention.

FIG. 13 is a circuit configuration diagram showing a DC-DC converter of Embodiment 2 of the present invention. The DC-DC converter of Embodiment 2 shown in FIG. 13 is different from the DC-DC converter of Embodiment 1 shown in FIG. 9 in the following points. The cathode of a diode Do is connected to a connection point between a reactor Ls and a reactor Ll. The anode of the diode Do, the negative electrode of a smoothing capacitor Co, one end of a resistor Ra are connected to the positive electrode of an output voltage terminal Vo. The positive electrode of the smoothing capacitor Co is connected to the negative electrode of the output voltage terminal Vo, the negative electrode of a direct-current power source Vi, the ground G of a control circuit 11. The other end of the resistor Ra is connected to a FB terminal of the control circuit 11.

Figure 14:
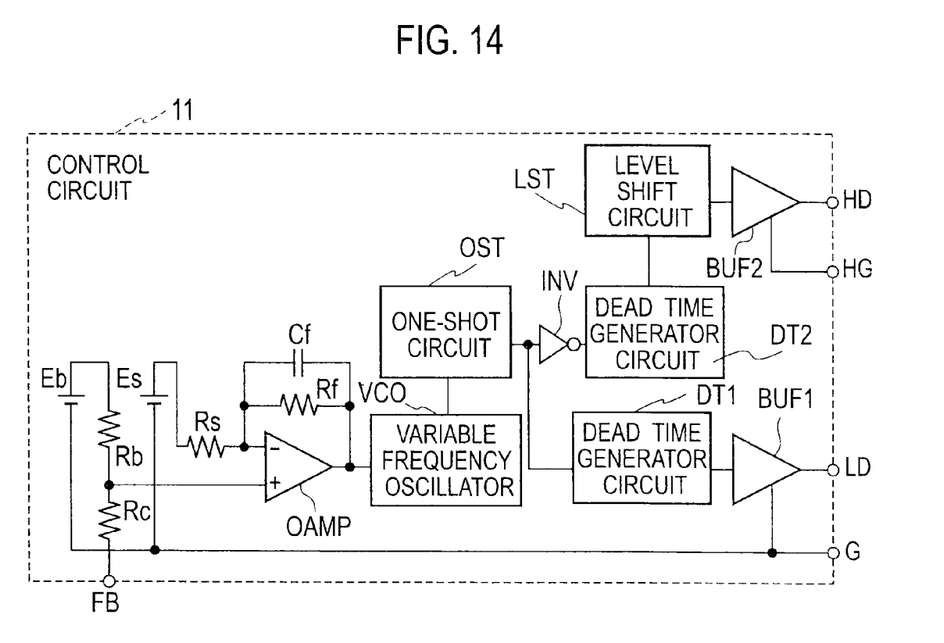
FIG. 14 is a detailed configuration block diagram of a control circuit in the DC-DC converter of Embodiment 2.

FIG. 14 shows the configuration of the control circuit 11. The control circuit 11 includes a variable frequency oscillator VCO, a one-shot circuit OST, an operational amplifier OAMP, a reference voltage Es, a resistor Rs, a resistor Rf, a capacitor Cf, a bias voltage Eb, a resistor Rb, a resistor Rc, an inverter INV, dead time generator circuits DT1, DT2, a level shifter circuit LST, and buffer circuits BUF1, BUF2.

At the FB terminal, the control circuit 11 detects an output voltage Vo through the resistor Ra. A series circuit including the resistors Rb, Rc is connected between the bias voltage Eb and the FB terminal. The operational amplifier OAMP compares a voltage at a connection point between the resistors Rb, Rc with the reference voltage Es applied through the resistor Rs, and outputs a comparison result as an error signal to the variable frequency oscillator VCO.

Figure 15:
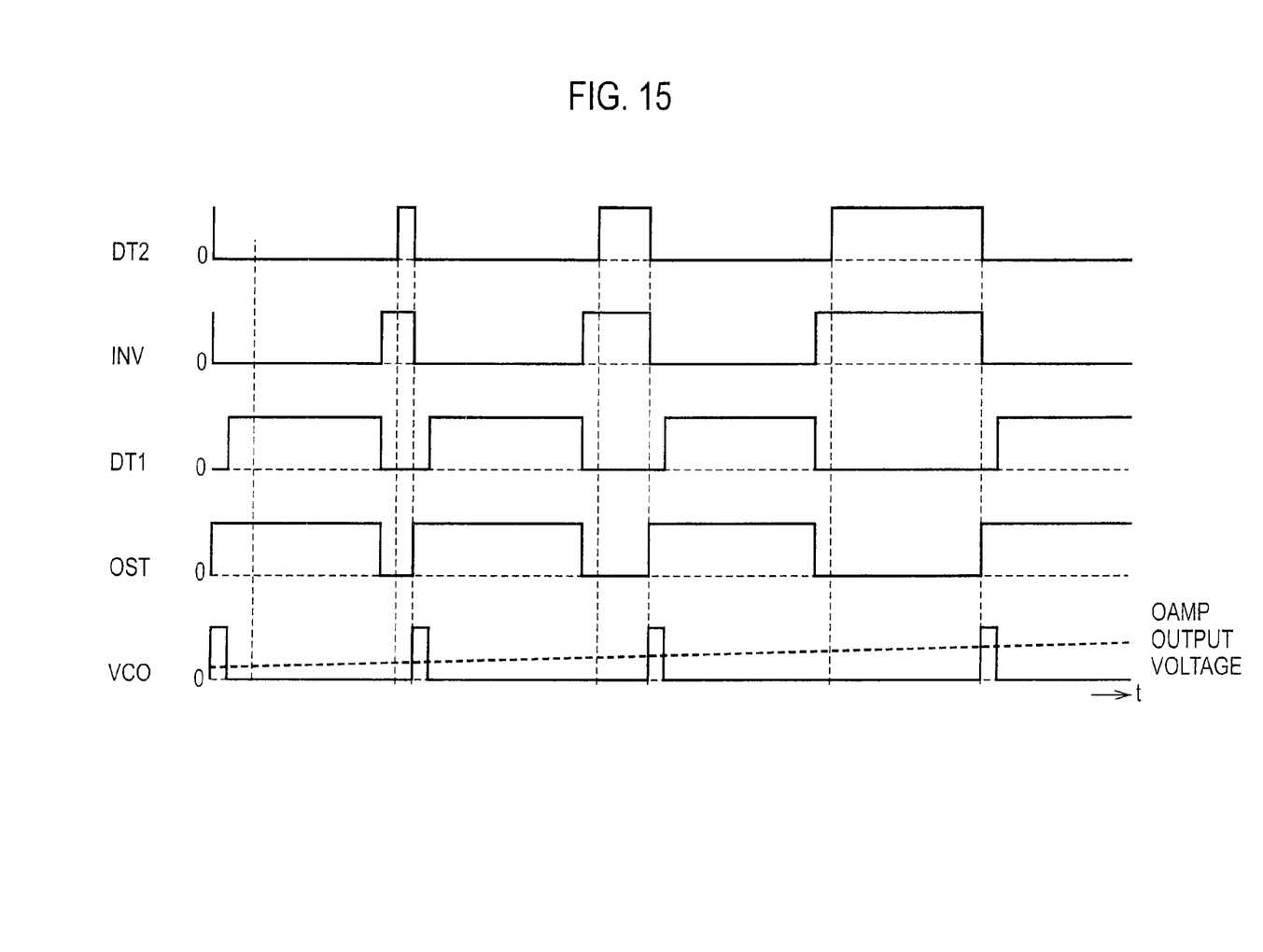
FIG. 15 is a diagram showing waveforms at units in the control circuit shown in FIG. 14.

In the control circuit 10 shown in FIG. 10, the inverter INV is provided in front of the dead time generator circuit DT1. In contrast, the control circuit 11 shown in FIG. 14 is different from the control circuit 10 in that the inverter INV is provided in front of the dead time generator circuit DT2. Since the variable frequency oscillator VCO, the one-shot circuit OST, the inverter INV, the dead time generator circuits DT1, DT2, the level shifter circuit LST, and the buffer circuits BUF1, BUF2 all of which are shown in FIG. 14 are the same as those shown in FIG. 10, descriptions thereof are herein omitted. FIG. 15 shows waveforms of the units of the control circuit 11.

Figure 16A:
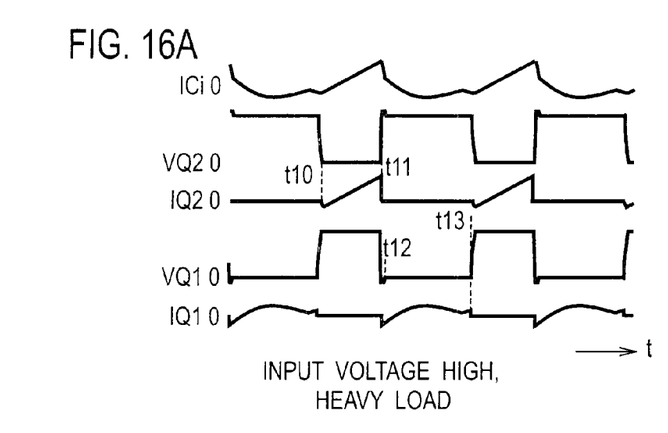
FIGS. 16A to 16D are diagrams showing waveforms at components in the DC-DC converter of Embodiment 2.
Figure 16B:
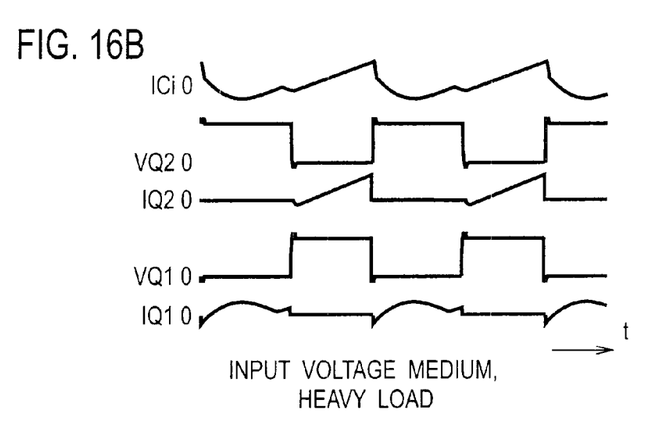
Figure 16C:
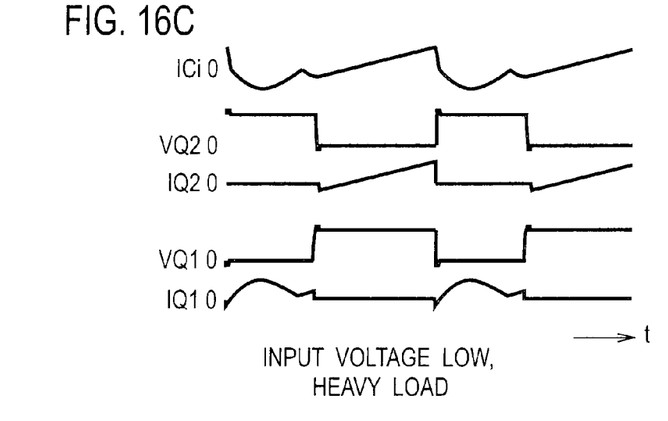
Figure 16D:
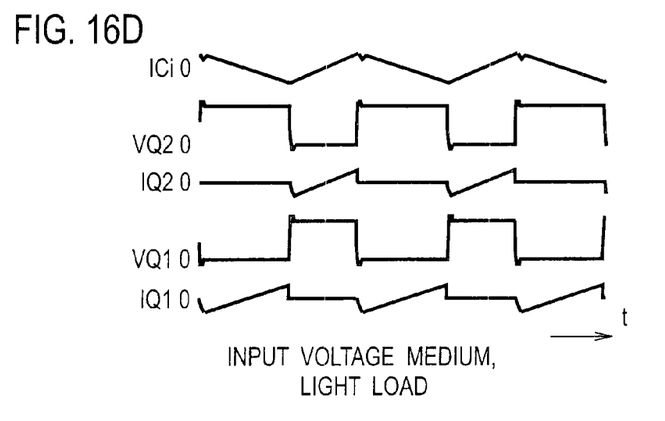

FIGS. 16A to 16D show waveforms at the components in the DC-DC converter of Embodiment 2 of the present invention. FIG. 16A shows waveforms at a high input voltage Vin and a heavy load; FIG. 16B, at a medium input voltage Vin and the heavy load; FIG. 16C, at a low input voltage Vin and the heavy load; and FIG. 16D, at the medium input voltage Vin and a light load.

Next, operations in Embodiment 2 configured as described above will be described in detail by referring to the waveforms at the respective components shown in FIGS. 16A to 16D.

Firstly, at time t10, once the switching element Q2 is turned on, first resonance currents flow through a path of Vi-Q2-Ci-Ls-Ll-Vi. The first resonance currents are resonance currents with a resonance frequency corresponding to the resonance between the capacitor Ci and the reactors (Ls+Ll). In this respect, since the reactors are set to satisfy Ls<<Ll, a resonance frequency f1 of the resonance is expressed with $$f1 \approx 1/2\pi\sqrt{Ci \cdot Ll}.$$ [Formula 4]

When the reactor Ll is increased, the resonance frequency f1 becomes much lower than a switching frequency, and is observed as straight lines between parts of a sinusoidal wave.

Once the switching element Q2 is turned off at time t11, the current stops flowing through the switching element Q2, and is commutated to the voltage resonant capacitor Cv, and the first resonance currents cause a voltage pseudo-resonance. When the voltage resonant capacitor Cv thereby discharges to zero volts, the polarity of the current is inverted and commutated to a parasitic diode of the switching element Q1. The zero voltage switching of the switching element Q1 is achieved by turning on the switching element Q1 during a time period (a negative current period of the current IQ1 in FIG. 16) when the current is flowing through the parasitic diode of the switching element Q1 for a dead time when the switching elements Q1, Q2 are OFF.

Once the switching element Q1 is turned on at a time t12, the first resonance current flows through a path of Ci-Q1-Ll-Ls-Ci, mainly using energy accumulated in the capacitor Ci as a voltage source. Furthermore, a second resonance current flows through a path of Ci-Q1-Co-Do-Ls-Ci. The second resonance current causes energy to be accumulated in the smoothing capacitor Co, and to be supplied as the output voltage Vo to the load.

The first resonance current is a resonance current with a resonance frequency corresponding to the resonance between the capacitor Ci and the reactors (Ls+Ll). In this respect, since the reactors are set to satisfy Ls<<Ll, a resonance frequency f1 of the resonance is expressed with $$f1 \approx 1/2\pi\sqrt{Ci \cdot Ll}.$$ [Formula 5]

When the reactor Ll is increased, the resonance frequency f1 becomes much lower than a switching frequency, and is observed as straight lines between parts of a sinusoidal wave.

The second resonance current is a resonance current with a resonance frequency corresponding to the resonance between a series capacitor (Ci//Co) and the reactor Ls. In general, since Ci<<Co, a resonance frequency f2 is expressed with $$f2 \approx 1/2\pi\sqrt{Ci \cdot Ls}.$$ [Formula 6]

The frequency f2 is set up by reducing the reactor Ls in a way that makes a half cycle of the sinusoidal wave appear in each ON width of the one-shot circuit OST.

Once the switching element Q1 is turned off at time t13, the current stops flowing through the switching element Q1, and is commutated to the voltage resonant capacitor Cv, and the first resonance currents cause a voltage pseudo-resonance. Once the voltage resonant capacitor Cv is thereby charged to a voltage of the direct-current power source Vi, the current is commutated to a parasitic diode of the switching element Q2. The zero voltage switching of the switching element Q2 is achieved by turning on the switching element Q2 during a time period (a negative current period of the current IQ2 in FIG. 16) when the current is flowing through the parasitic diode of the switching element Q2 for a dead time when the switching elements Q1, Q2 are OFF.

The output voltage Vo is controlled based on the ON/OFF ratio of each of the switching elements Q1, Q2.

Because of Ll>>Ls, the following equations are given in a period in which the resonance can be maintained.

$$Vo \approx VCi$$

$$Vo \approx Vi \times DQ2 \ (DQ2 \text{ denotes the ON/OFF ratio of the switching element } Q2.) \tag{2}$$

Judging from the equations (2), there is no direct relationship between the load current and the output voltage, and thus the ON/OFF ratio of each of the switching elements Q1, Q2 hardly changes in response to the change in the load current. In the actual circuit, however, their ON/OFF ratios slightly change in order to compensate for a voltage drop which occurs due to a line drop, resistance components of the respective semiconductor elements, and the like.

Figure 17:
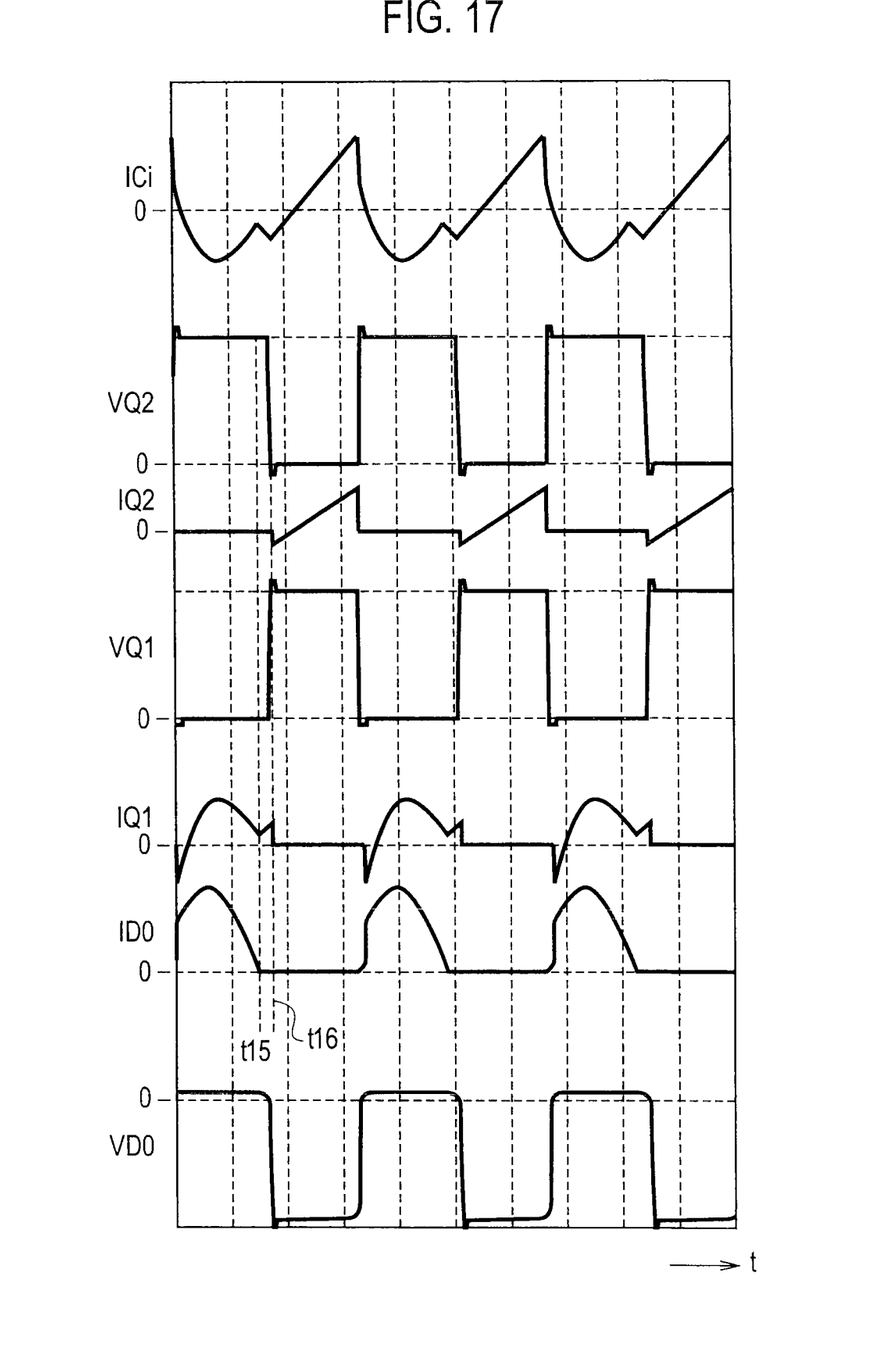
FIG. 17 is a diagram showing more detailed waveforms at the components in the DC-DC converter of Embodiment 2.

FIG. 17 is a diagram showing more detailed waveforms at the components in the DC-DC converter of Embodiment 2. FIG. 17 shows a waveform of a current IDo of the diode Do and a waveform of a voltage VDo of the diode Do in addition to the waveforms of the elements shown in FIGS. 16A to 16D.

As seen from FIG. 17, after the diode Do turns off at time t15, the switching element Q2 is turned on at time t16. This provides an effect that no recovery current flows when the diode Do is OFF.

In addition, a small rated current is enough for the reactor L1, and the reactor L1 can be made small in size, because the current flowing through the load does not pass through the reactor L1. In addition, no transformer need be used, since power is supplied to the load through the path of Ci-Ls-Do-Co.

As described above, the DC-DC converter of Embodiment 2 provides the same effect as does the DC-DC converter of Embodiment 1.

The present invention can provide the low-noise and high efficient DC-DC converter which hardly causes the ON/OFF ratio of each of the switching elements to change in response to the change in the load, and which is good at the load response characteristic, because: the DC-DC converter is provided with the second series circuit which is connected to the two ends of the first switching element, and in which the first capacitor, the first reactor, and the second reactor having a value larger than that of the first reactor are connected together in series; and the direct-current output voltage is outputted by rectifying and smoothing the voltage of the second reactor.

The present invention is applicable to a converter for a switching power supply apparatus or the like.

What is claimed is:

1. A DC-DC converter comprising:
   a first series circuit which is connected to two ends of a direct-current power source, and in which a first switching element and a second switching element are connected together in series;
   a control circuit configured to alternately turn on and off the first switching element and the second switching element;
   a second series circuit which is connected to two ends of the first switching element, and in which a first capacitor, a first reactor and a second reactor having a larger value than the first reactor are connected together in series; and
   a rectifying/smoothing circuit configured to rectify and smooth a voltage between two ends of the second reactor, and to output a direct-current output voltage.

2. The DC-DC converter according to claim 1, wherein the rectifying/smoothing circuit is a half-wave rectifying/smoothing circuit including a rectifying element and a smoothing element.

3. The DC-DC converter according to claim 2, wherein one end of the second reactor is connected to one end of the direct-current power source.

4. The DC-DC converter according to claim 2, wherein one end of the direct-current power source and one end of the direct-current output voltage are connected together with same polarities given to the ends.

5. The DC-DC converter according to claim 2, wherein one end of the direct-current power source and one end of the direct-current output voltage are connected together with opposite polarities respectively given to the ends.

6. The DC-DC converter according to claim 1, wherein one end of the second reactor is connected to one end of the direct-current power source.

7. The DC-DC converter according to claim 1, wherein one end of the direct-current power source and one end of the direct-current output voltage are connected together with same polarities given to the ends.

8. The DC-DC converter according to claim 1, wherein one end of the direct-current power source and one end of the direct-current output voltage are connected together with opposite polarities respectively given to the ends.

* * * * *